(12) United States Patent
Wotzak et al.

(10) Patent No.: US 10,287,977 B2
(45) Date of Patent: May 14, 2019

(54) INLINE PROPELLER GEARBOX BRAKE

(71) Applicant: General Electric Company, Schenectady, NY (US)

(72) Inventors: Mark Gregory Wotzak, Chestnut Hill, MA (US); Daniel Waslo, Marblehead, MA (US)

(73) Assignee: General Electric Company, Schenectady, NY (US)

(*) Notice: Subject to any disclaimer, the term of this patent is extended or adjusted under 35 U.S.C. 154(b) by 503 days.

(21) Appl. No.: 15/044,211

(22) Filed: Feb. 16, 2016

(65) Prior Publication Data

US 2017/0234217 A1    Aug. 17, 2017

(51) Int. Cl.
| | | |
|---|---|---|
| *B64D 27/10* | (2006.01) | |
| *F02C 3/04* | (2006.01) | |
| *F02C 3/107* | (2006.01) | |
| *F02C 6/20* | (2006.01) | |
| *F02C 7/36* | (2006.01) | |
| *F16H 1/28* | (2006.01) | |
| *F16H 57/10* | (2006.01) | |

(52) U.S. Cl.
CPC .............. *F02C 3/107* (2013.01); *B64D 27/10* (2013.01); *F02C 3/04* (2013.01); *F02C 6/20* (2013.01); *F02C 6/206* (2013.01); *F02C 7/36* (2013.01); *F16H 57/10* (2013.01); *F05D 2220/323* (2013.01); *F05D 2240/60* (2013.01); *F05D 2260/40311* (2013.01); *F05D 2260/902* (2013.01); *F16H 1/28* (2013.01)

(58) Field of Classification Search
CPC . B64D 27/10; F02C 3/107; F02C 6/20; F02C 6/206; F02C 7/36; F05D 2220/323; F05D 2240/60; F05D 2260/40311; F05D 2260/902; F16H 1/28; F16H 57/10
See application file for complete search history.

(56) References Cited

U.S. PATENT DOCUMENTS

| | | | |
|---|---|---|---|
| 4,793,447 A | | 12/1988 | Taig et al. |
| 4,878,401 A | * | 11/1989 | Chung ...................... F16H 3/56 |
| | | | 475/153 |
| 5,183,386 A | | 2/1993 | Feldman et al. |
| | | | (Continued) |

FOREIGN PATENT DOCUMENTS

| | | | | |
|---|---|---|---|---|
| EP | 0087302 A1 | * | 8/1983 | ............. F02C 3/107 |
| JP | 02212293 A | * | 8/1990 | ............... B63H 5/10 |
| | (Continued) | | | |

*Primary Examiner* — Igor Kershteyn
*Assistant Examiner* — Christopher R Legendre
(74) *Attorney, Agent, or Firm* — Dority & Manning, P.A.

(57) ABSTRACT

An in-line propeller gearbox of a turboprop gas turbine engine includes an epicyclic gearing arrangement that has a sun gear, a ring gear and at least one planet gear disposed between and meshing with both the sun gear and the ring gear. The propeller gearbox includes a disk brake that can be operated to slow down or stop altogether the rotation of the propeller. The disk brake has an axially extending shaft having at one end a disk and at the opposite end a gear having teeth that engage with one of the gears in the epicyclic gearing arrangement. The disk brake includes a hydraulic caliper or an electric caliper that can be actuated to slow down rotation of the disk to an eventual full stop and to hold the disk at full stop to thereby stop rotation of the propeller.

18 Claims, 1 Drawing Sheet

(56) References Cited

U.S. PATENT DOCUMENTS

| | | | |
|---|---|---|---|
| 5,451,141 A | 9/1995 | Carvalho et al. | |
| 6,182,576 B1 | 2/2001 | Svensson | |
| 6,264,138 B1 | 7/2001 | Hawkins | |
| 6,527,671 B2 * | 3/2003 | Paalasmaa | F16H 3/72 477/104 |
| 6,537,169 B1 * | 3/2003 | Morii | F16H 3/721 475/10 |
| 7,493,992 B2 | 2/2009 | Rogers | |
| 7,815,536 B2 | 10/2010 | Jansen et al. | |
| 7,849,668 B2 | 12/2010 | Sheridan | |
| 8,433,449 B2 | 4/2013 | Vos et al. | |
| 8,701,380 B2 | 4/2014 | Vuillemin | |
| 2014/0150401 A1 | 6/2014 | Venter | |
| 2014/0208760 A1 | 7/2014 | Dubreuil et al. | |
| 2014/0231188 A1 | 8/2014 | Prouzet | |
| 2014/0377079 A1 | 12/2014 | Gieras et al. | |
| 2017/0234217 A1 * | 8/2017 | Wotzak | F02C 3/107 416/169 R |

FOREIGN PATENT DOCUMENTS

| | | | | |
|---|---|---|---|---|
| KR | 20120140356 A | * | 12/2012 | |
| WO | WO 2015099077 A1 | * | 7/2015 | F16H 61/0021 |

* cited by examiner

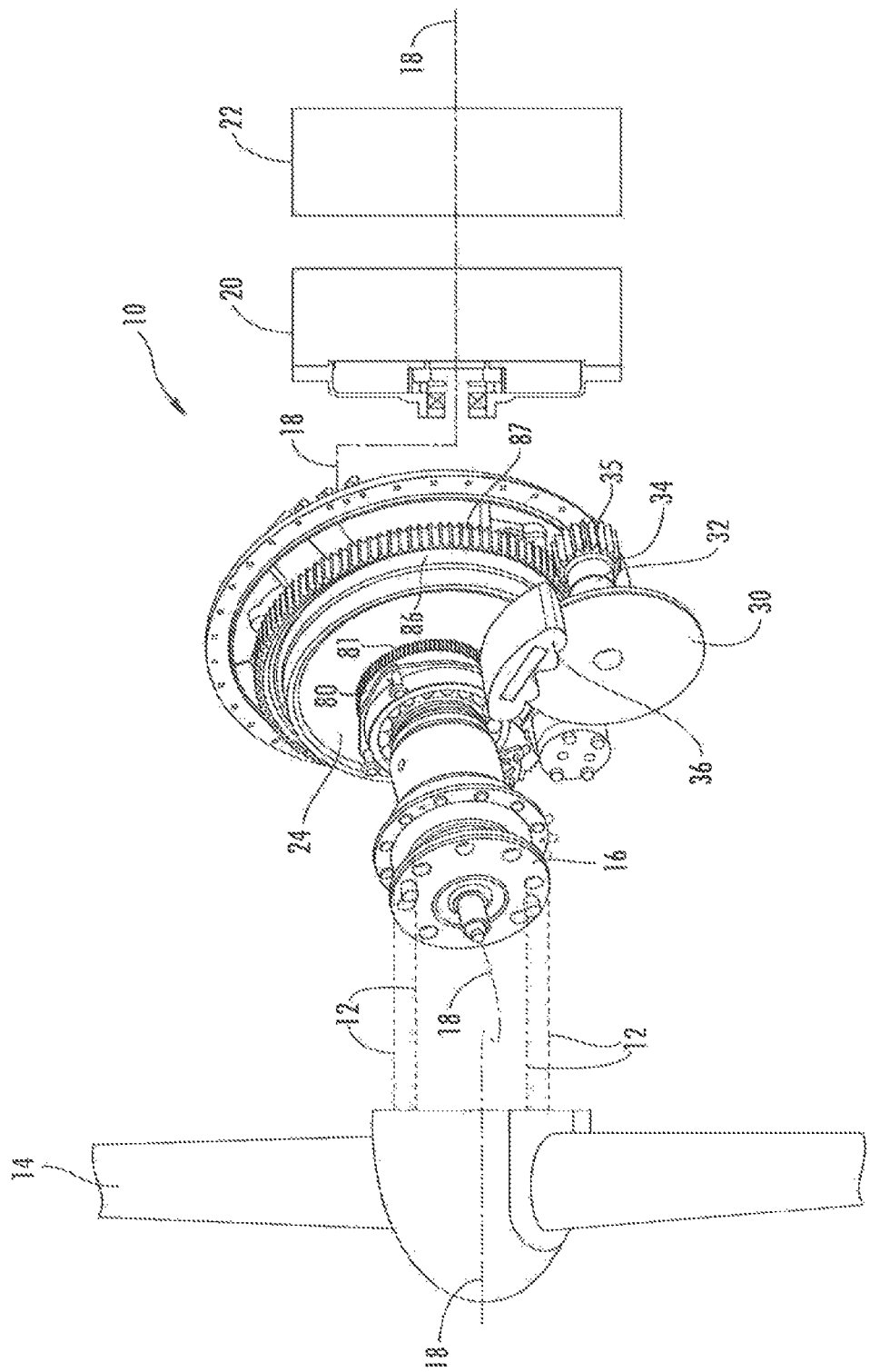

_US 10,287,977 B2_

INLINE PROPELLER GEARBOX BRAKE

FIELD OF THE INVENTION

The present subject matter relates generally to an inline propeller gearbox for a turboprop engine, and/or more particularly to an inline brake therefor.

BACKGROUND OF THE INVENTION

An in-line turboprop engine generally includes in serial alignment in the direction of the flow through the propulsion system, a propeller, an air intake and an engine arranged in flow communication with one another in succession. Thus, the air intake is disposed downstream of the propeller, and the engine is disposed downstream of the air intake in the direction of the flow through the engine. The gas turbine engine generally includes, in serial fluid flow order, a compressor section, a combustion section, a high pressure turbine section, a power turbine section and an exhaust section. Air is drawn into the air intake and compressed by the compressor in the compressor section. Fuel is added in the combustion section, and the fuel-air mixture is combusted in the combustion section to produce hot combustion gases that expand through the high pressure and power turbine sections and produce rotational mechanical energy that can be tapped to drive one or more shafts that are coupled to the power turbine. In order of succession, there is the propeller at the very front of the engine, followed by the propeller gearbox, followed by the exhaust, followed by the power turbine, followed by the high pressure turbine, followed by the compressor and followed by the air inlet, which is at the aft end of the engine.

With multi-shaft gas turbine engines, a compressor shaft that is driven by the high pressure turbine is used to drive the compressor in the compressor section. A propeller shaft that is driven by the power turbine is used to provide rotational input to a reduction gear that converts the high revolutions per minute but low torque rotation of the power turbine into a low rotation per minute but high torque rotation that is used to drive the propeller. The reduction gear can be housed in a propeller gearbox of an epicyclic gearing arrangement, which allows the propeller to be rotated at fewer revolutions per unit of time than the rotational speed of the power turbine for greater efficiency. The propeller gearbox rotatably supports a sun gear that is disposed centrally with respect to a ring gear and a plurality of planet gears, which are disposed around the sun gear and engage between the sun gear and the ring gear. The power turbine shaft provides the input to the epicyclic gearing arrangement by being coupled to the sun gear, while the propeller can be coupled in line with the power turbine shaft to rotate in unison with the carrier of the planet gears or with the ring gear, depending upon whether a star gearbox or a planetary gearbox is used. Each planet gear meshes with the sun gear and with the ring gear. One of the carrier or the ring gear may be held stationary, but not both of them. Each planet gear is rotatable on its own bearing that is mounted on a support pin housed within a epicyclic gearing arrangement, which is fixed to the peripheral region of the carrier of the epicyclic gearing arrangement.

When the aircraft is on the ground, electric power nonetheless must be generated to operate various electrical systems on the aircraft. This auxiliary electric power can be provided by an auxiliary power unit (APU). A portable gas powered electric generator can be moved from a ground storage facility to the aircraft and connected to the electrical system of the aircraft when the aircraft is on the ground and requires this auxiliary power to run its electrical systems in the absence of operation of the turboprop engine. However, this solution has operational costs that stem from the need to maintain the equipment on the ground and competent personnel to connect it and disconnect it each time the aircraft requires electrical power when on the ground. Accordingly, some aircraft carry on board a small gas turbine engine that can be operated to provide the auxiliary electric (or hydraulic) power, but this solution has the drawback of the increased cost of the engine and the additional weight that must be carried by the aircraft even when the engine is not needed. While this auxiliary power can be provided by aircraft's own turboprop engine, a rotating propeller during operation of the aircraft engine to generate the auxiliary power when the aircraft is on the ground becomes problematical due to concerns for the safety of passengers and ground crew who could be seriously injured or killed by contact with the rotating propeller.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an in-line propeller gearbox of a turboprop gas turbine engine includes an epicyclic gearing arrangement that has a sun gear, a ring gear and at least one planet gear disposed between and meshing with both the sun gear and the ring gear. The propeller gearbox includes a disk brake that can be operated to slow down or stop altogether the rotation of the propeller. The disk brake has an axially extending shaft having at one end a disk and at the opposite end a gear having teeth that engage with one of the gears in the epicyclic gearing arrangement, whether the sun gear or the ring gear or the planet gear. The disk brake includes an hydraulic caliper or an electric caliper that can be actuated to slow down rotation of the disk to an eventual full stop and to hold the disk at full stop.

Each of the above exemplary embodiments of the present disclosure permits the turboprop engine to be tapped for providing auxiliary power when the aircraft is on the ground without safety concerns attendant a rotating propeller. In so doing, the need for a separate Auxiliary Power Unit is eliminated. Moreover, the cost, weight and space requirements of the brake are significantly less than those same requirements for an onboard auxiliary engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGURES, in which:

FIG. 1 is a schematic cross-sectional view of an exemplary in-line turboprop gas turbine engine according to various embodiments of the present disclosure.

DETAILED DESCRIPTION OF ILLUSTRATIVE EMBODIMENTS

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic view, with certain components depicted in perspective, of an inline turboprop gas turbine engine in accordance with an exemplary embodiment of the present disclosure. The configuration and operation of a conventional inline turboprop gas turbine engine is well known and will not be repeated herein. Nonetheless, there will be references to certain of its conventional components to the extent necessary to explain the environmental context of the present invention.

More particularly, for the embodiment of FIG. 1, the propeller gearbox is generally designated by the numeral 10. The two pairs of parallel dashed lines 12 schematically represent attachment of the propeller 14 to the rotatable output flange 16 of the propeller gearbox 10. This output flange 16 is rotatable about a virtual axis of rotation 18 and is in line with the rotational axis of the propeller 14. As shown in FIG. 1, the power turbine section of the gas turbine engine is schematically represented by the rectangle that is designated by the numeral 20. The compressor section is schematically represented by the rectangle that is designated by the numeral 22.

As shown in FIG. 1, an axial direction extends parallel to the virtual axis of rotation 18 provided for reference, and a radial direction is normal to the axial direction. As is conventional, the combustion section would be disposed between the compressor section 22 and the power turbine section 20, but since the combustion section is of no particular concern in the context of the present invention, it is not separately designated in the schematic representations depicted in FIG. 1. Similarly, since the high pressure turbine section that drives the compressor is of no particular concern in the context of the present invention, it too is not separately designated in FIG. 1.

For the embodiments depicted in FIG. 1, the propeller 14 is rotatable about the virtual axis of rotation 18 via a propeller shaft (not shown) that is powered by the turbine shaft (not shown) across the propeller gear box 10, which includes an epicyclic gearing arrangement having a plurality of gears for adjusting the rotational speed of the propeller shaft relative to the turbine shaft to a more efficient rotational propeller speed.

As schematically shown in FIG. 1 for example, the propeller gearbox 10 desirably is an epicyclic gearing arrangement having a ring gear 86 that is disposed circumferentially around a sun gear 80 and at least one planet gear and possibly a plurality of planet gears, none of the planet gears being visible in the view shown in FIG. 1. Each of the planet gears (assuming more than one) is hidden from view beneath the housing cover 24. The epicyclic gearing arrangement has only a single input and a single output and includes the sun gear 80 rotatable about a virtual axis of rotation 18 and defining a sun gear surface having sun teeth 81. The ring gear 86 of the epicyclic gearing arrangement is rotatable about the virtual axis of rotation 18 and surrounds the sun gear 80 and defines a first ring gear surface having ring teeth facing toward the sun teeth 81 of the sun gear 80 but hidden from view in FIG. 1 by the housing 24. The epicyclic gearing arrangement has at least one planet gear disposed between the sun gear 80 and the ring gear 86 and defining a first planet gear surface having planet teeth in meshing engagement with both the sun teeth 81 of the sun gear 80 and the inwardly facing ring teeth of the ring gear 86.

Nonetheless, as is conventional, the carrier carries at least one planet gear and desirably an annular array of planet gears 84. The propeller gearbox 10 desirably can include four planet gears but varying numbers of planet gears may be used. In some embodiments, the rotational axis of each planet gear is rotatable with respect to the virtual axis of rotation 18 about which each of the sun gear 80 and the ring gear 86 rotate. In other embodiments, the ring gear 86 is rotated by the rotation of the planet gear, and the rotational axis of the planet gear remains fixed with respect to the virtual axis of rotation 18 about which each of the sun gear 80 and the ring gear 86 rotate.

An exemplary embodiment of an epicyclic gearing arrangement contemplated herein desirably employs a star configuration (the ring gear 86 rotates around the sun gear 80 while the rotational axes of the planet gears remain fixed with respect to the rotational axis of the sun gear 80), and it is the ring gear 86 that is non-rotatably coupled to the propeller shaft in a conventional manner so that they rotate in unison at the same speed. However, the manner of this coupling is not critical to an understanding of the present disclosure and thus need not be further discussed. In this exemplary embodiment employing a star configuration of an epicyclic gearing arrangement, it is the carrier that is coupled to the outer casing 18, and the specifics of this coupling also are not needed for the explanation of the desired aspects of the present invention.

However, in both embodiments (planetary and star), and as schematically shown in FIG. 1 example, the ring gear 86 is rotatably enmeshed with each planet gear, which is rotatably carried by a bearing that in turn is carried by a planet gearbox that in turn is carried by the carrier. As the respective bearings and carrier are not the focus of the present disclosure, their details have not been depicted in the drawing.

In the embodiment shown in FIG. 1 for example, the outer ring of the planet gear desirably is a single-piece component that forms both the gear tooth surface of the planet gear and the cylindrical interior surface that defines outer race of the planet bearing. The cylindrical interior surface of the planet gear of the planet bearing contacts and retains the rollers of the planet bearing. Thus, the outer cylindrical surface of the outer ring of the planet bearing is defined by a gear tooth surface that is configured to mesh with both the gear tooth surface 81 of the sun gear 80 and the inwardly facing gear tooth surface of the ring gear 86. As noted above, in the view shown in FIG. 1, the inwardly facing gear tooth surface of the ring gear 86 is hidden from view by the housing 24. The outwardly facing gear tooth surface 87 of the ring gear 86 is disposed opposite to the inwardly facing gear tooth surface and is visible in the view shown in FIG. 1.

The inline propeller gearbox for a turboprop engine includes a disk brake disposed in braking engagement with at least one of the sun gear 80, the ring gear 86 and the at least one planet gear. As schematically shown in FIG. 1, the disk brake includes a disk 30, which desirably has a circular perimeter. The disk 30 is non-rotatably mounted on an axially elongated shaft 32 having a central axis of rotation. The disk brake further includes a brake gear 34 defining a plurality of brake gear teeth 35. The brake gear 34 is non-rotatably mounted on the shaft 32 such that the central axis of rotation of the shaft 32 coincides with the central axis of rotation of the circular disk 30 and the central axis of rotation of the brake gear. In some embodiments, the shaft 32 and the brake gear 34 can be formed as a unitary component as by being milled from a single blank or cast in a single mold. The disk brake includes a caliper 36 that engages the disk 30 of the disk brake. This caliper 30 can be either an hydraulic caliper or an electric caliper for example.

The brake gear 34 of the disk brake is disposed so that its brake gear teeth 35 mesh with the respective teeth that are carried by one of the sun gear 80, the ring gear 86 or the planet gear (not visible in the view shown in FIG. 1). The particular view shown in FIG. 1 has the brake teeth 35 of the brake gear 34 engaging with the outwardly facing gear tooth surface 87 of the ring gear 86. Thus, rotation of the brake gear 34 of necessity results in rotation of the ring gear 86 in unison and vice versa.

In operation, the caliper 36 is actuated (whether electrically or hydraulically) to engage the disk 30 of the disk brake to bring the disk 30 to a non-rotating state. Because the disk 30 and the brake gear 34 both are non-rotatably coupled to the brake shaft 32, when the disk 30 stops rotating, the brake shaft 32 and the brake gear 34 also stop rotating. Because the brake gear 34 engages with one of the gears (whether ring gear 86, the sun gear 80 or one of the planet gears) of the epicyclic gearing arrangement, when the disk 30 stops rotating the respective gear that engages the brake gear 34 likewise stops rotating. Accordingly, the brake prevents the epicyclic gearing arrangement from transmitting the rotation of the input shaft to the propeller shaft and thus prevents rotation of the propeller 14. However, in the particular braking arrangement depicted in FIG. 1, because of the favorable gear ratio between the ring gear 86 and the brake gear 34, there is much less torque on the brake shaft 32 and thus much less clamping force that needs to be applied by the caliper 36 under this braking arrangement.

Each of the above exemplary embodiments of the present disclosure permits the turboprop engine 10 to be tapped for providing auxiliary power when the aircraft is on the ground without safety concerns attendant a rotating propeller 14. In so doing, the need for a separate Auxiliary Power Unit is eliminated. Moreover, the cost, weight and space requirements of the brake are significantly less than those same requirements for an onboard auxiliary engine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. An inline propeller gearbox for a turboprop engine, comprising:
    an epicyclic gearing arrangement that has only a single input and a single output and including;
        a sun gear rotatable about the virtual axis of rotation and defining a sun gear surface having sun teeth;
        a ring gear rotatable about the virtual axis of rotation and surrounding the sun gear and defining a first ring gear surface having ring teeth facing toward the sun teeth of the sun gear; and
        at least one planet gear disposed between the sun gear and the ring gear and defining a first planet gear surface having planet teeth in meshing engagement with both the sun teeth of the sun gear and the ring teeth of the ring gear;
    a disk brake disposed in braking engagement with at least one of the sun gear, the ring gear and the at least one planet gear;
    wherein the disk brake includes a circular disk non-rotatably mounted on a shaft having a central axis of rotation, the disk brake further including a brake gear defining a plurality of brake gear teeth and non-rotatably mounted on the shaft such that the central axis of rotation of the shaft coincides with a central axis of rotation of the circular disk and a central axis of rotation of the brake gear; and
    further wherein the brake gear teeth of the disk brake mesh with the sun teeth of the sun gear.

2. The inline propeller gearbox of claim 1, wherein the disk brake includes an electric caliper.

3. The inline propeller gearbox of claim 1, wherein the disk brake includes a hydraulic caliper.

4. The inline propeller gearbox of claim 1, wherein the disk brake includes a hydraulic caliper that engages the circular disk.

5. The inline propeller gearbox of claim 1, wherein the disk brake includes an electric caliper that engages the circular disk.

6. An inline propeller gearbox for a turboprop engine, comprising:
    an epicyclic gearing arrangement that has only a single input and a single output and including;
        a sun gear rotatable about the virtual axis of rotation and defining a sun gear surface having sun teeth;
        a ring gear rotatable about the virtual axis of rotation and surrounding the sun gear and defining a first ring gear surface having ring teeth facing toward the sun teeth of the sun gear; and
        at least one planet gear disposed between the sun gear and the ring gear and defining a first planet gear surface having planet teeth in meshing engagement with both the sun teeth of the sun gear and the ring teeth of the ring gear;

a disk brake disposed in braking engagement with at least one of the sun gear, the ring gear and the at least one planet gear;

wherein the disk brake includes a circular disk non-rotatably mounted on a shaft having a central axis of rotation, the disk brake further including a brake gear defining a plurality of brake gear teeth and non-rotatably mounted on the shaft such that the central axis of rotation of the shaft coincides with a central axis of rotation of the circular disk and a central axis of rotation of the brake gear; and further wherein the brake gear teeth of the disk brake mesh with the ring teeth of the ring gear.

7. The inline propeller gearbox of claim 6, wherein the disk brake includes an electric caliper.

8. The inline propeller gearbox of claim 6, wherein the disk brake includes a hydraulic caliper.

9. An inline propeller gearbox for a turboprop engine, comprising:

an epicyclic gearing arrangement that has only a single input and a single output and including;

a sun gear rotatable about the virtual axis of rotation and defining a sun gear surface having sun teeth;

a ring gear rotatable about the virtual axis of rotation and surrounding the sun gear and defining a first ring gear surface having ring teeth facing toward the sun teeth of the sun gear; and at least one planet gear disposed between the sun gear and the ring gear and defining a first planet gear surface having planet teeth in meshing engagement with both the sun teeth of the sun gear and the ring teeth of the ring gear;

a disk brake disposed in braking engagement with at least one of the sun gear, the ring gear and the at least one planet gear;

wherein the disk brake includes a circular disk non-rotatably mounted on a shaft having a central axis of rotation, the disk brake further including a brake gear defining a plurality of brake gear teeth and non-rotatably mounted on the shaft such that the central axis of rotation of the shaft coincides with a central axis of rotation of the circular disk and a central axis of rotation of the brake gear; and further wherein the brake gear teeth of the disk brake mesh with the planet teeth of the at least one planet gear.

10. A turboprop engine comprising:

a propeller including a plurality of blades extending radially from a hub and rotatable about a first axis of rotation defined centrally through the hub;

a compressor disposed downstream from the propeller;

a turbine disposed downstream of the compressor;

a rotatable input shaft mechanically coupling the compressor to rotate in unison with the turbine;

an epicyclic gearing arrangement that has only a single input and that includes a carrier, a sun gear rotatable about a second axis of rotation that is parallel to the first axis of rotation, a ring gear disposed circumferentially around the sun gear, at least one planet gear that meshes with both the sun gear and the ring gear; and an engine envelope surrounding a fan, the compressor, the turbine and the epicyclic gearing arrangement, wherein one of the ring gear and the carrier is non-rotatably coupled to the engine envelope; and the epicyclic gearing arrangement further including a disk brake disposed in braking engagement with at least one of the sun gear, the ring gear and the at least one planet gear.

11. The turboprop engine of claim 10, wherein the disk brake includes an electric caliper.

12. The turboprop engine of claim 10, wherein the disk brake includes a hydraulic caliper.

13. The turboprop engine of claim 10, wherein the disk brake includes a circular disk non-rotatably mounted on a shaft having a central axis of rotation, the disk brake further including a brake gear defining a plurality of brake gear teeth and non-rotatably mounted on the shaft such that the central axis of rotation of the shaft coincides with a central axis of rotation of the circular disk and a central axis of rotation of the brake gear.

14. The turboprop engine of claim 13, wherein the disk brake includes a hydraulic caliper that engages the circular disk.

15. The turboprop engine of claim 13, wherein the disk brake includes an electric caliper that engages the circular disk.

16. The turboprop engine of claim 13, wherein the brake gear teeth of the disk brake mesh with the sun teeth of the sun gear.

17. The turboprop engine of claim 13 wherein the brake gear teeth of the disk brake mesh with the ring teeth of the ring gear.

18. The turboprop engine of claim 13, wherein the brake gear teeth of the disk brake mesh with the planet teeth of the at least one planet gear.

* * * * *